Nov. 8, 1938.                C. D. NAGLE                2,135,622
          AGING DEVICE FOR THE CONTENTS OF BARRELS, CASKS, OR THE LIKE
                            Filed May 20, 1935

Clarence D. Nagle, Inventor

By J. J. Dowling, Attorney

Patented Nov. 8, 1938

2,135,622

UNITED STATES PATENT OFFICE 2,135,622

AGING DEVICE FOR THE CONTENTS OF BARRELS, CASKS, OR THE LIKE

Clarence D. Nagle, Baltimore, Md.

Application May 20, 1935, Serial No. 22,310

1 Claim. (Cl. 99—277.1)

This invention relates to new and novel means for materially speeding the aging of spirited liquids, more particularly whiskey, and has for its primary object the provision of a device capable of being quickly placed on the interior of a barrel, cask or the like, wherein the contents of said barrel, cask or the like, may have an increased area of charred surface to assure the speedy aging action.

A further object of this invention is the provision of an aging device for barrels, casks or the like, embodying a substantially rectangular frame, the supports and elements of the frame being relatively spaced apart to permit the free agitation of liquid thereover and having all of their areas fully charred and being of such construction as to be easily and quickly inserted in a barrel, cask or the like, to assist in hastening the aging action of the contents of said containers.

A still further object of the invention is the provision of an aging device constructed of material that can be quickly and easily charred in its entirety and of such construction as to render it adaptable to be easily supported and contained within a barrel, cask or the like, for assisting in the aging of the contents of said containers.

A still further object of the invention is the provision of an aging device of such construction as to render it possible to be easily and quickly manufactured and as readily and easily placed in use.

With these and other objects in view, the invention consists of certain novel features, combination and arrangement of parts as will be hereinafter more fully described, pointed out in the accompanying drawing, and claimed.

The usual procedure in aging whiskey is by charring the interior of a barrel or cask, placing the spirits therein, and placing the container and its spirits in high heats, and by virtue of the charred surfaces and high heats the whiskey is normally aged over a period of time. It is to reduce this element of time that the present invention has been devised.

Figure 1:
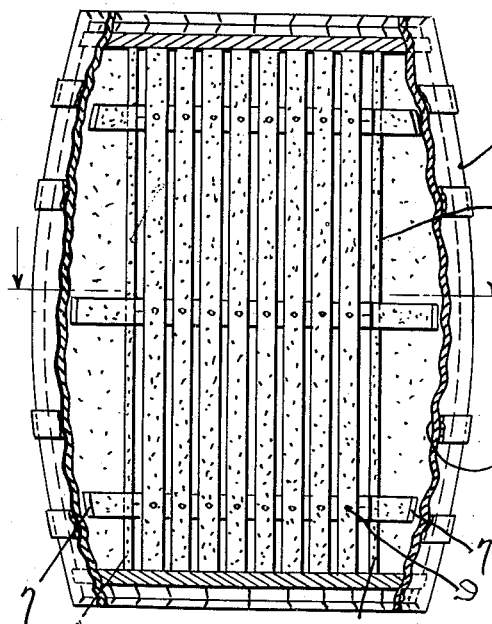
Figure 1 is a vertical sectional view of a barrel or cask, illustrating my invention in full position and in section.
Figure 2:
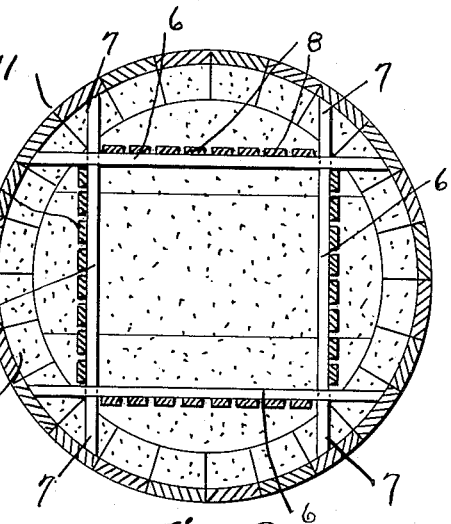
Figure 2 is a transverse sectional view, taken on the line 2—2 of Figure 1.
Figure 3:
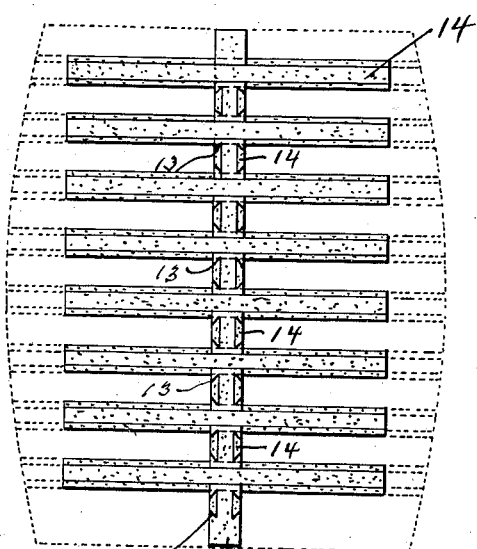
Figure 3 is a side elevational view of a slightly modified form of the invention, with a barrel or cask in dotted lines; and, Figure 4 is a vertical sectional view of the modified form.
Figure 4:
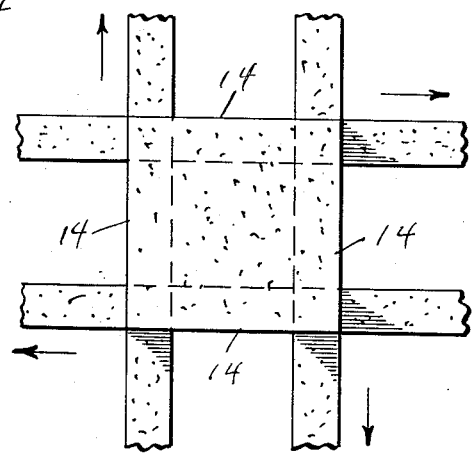

The present invention comprises in its construction frame members 6, and each frame member provided on its opposite side longitudinal edges with laterally extending relatively spaced extensions 7, and the extensions 7 intersect the extensions of each other, as clearly shown in Figure 2, so that the frame members provide a substantially rectangular structure and interposed between the frame members 6 and extensions 7 are the spaced slat elements 8, and they are secured to the frame members by suitable fastening members 9 found suitable for the purpose. The entire inner and outer surfaces of the frame members 6, extensions 7 and slats 8, are charred identically with the charred interior surface 10 of the barrel or cask 11, thus giving a greater area of charred surface to the interior of the barrel or cask when placed therein, so as to materially hasten the aging action of the contents thereof.

It can be readily seen that this structure can be assembled prior to placing the same in a barrel or cask, and can be inserted therein by loosening the hoops of said container, or its entire exterior diameter will permit it to be inserted through the head of the container prior to the same being placed in position.

Referring to the modification, there is provided a central rectangular member 12, which is provided on each of its side faces with dovetailed grooves 13, in which are mortised slidable charred spaced slat members 14. These spaced slat members extend an equal distance beyond the standard 12 and may be held in position either by friction or other suitable means found desirable for the purpose. The entire structure forming the device, including the members 12, 13 and 14, is fully charred and assumes the identical position of the preferred form described. Thus, it can be seen that a device of this character, when in use, increases the interior charred surface, which will necessarily and materially increase and speed up the aging action of the contents of the container in which the device is used.

Having thus described my invention, what I claim as new is:

An aging device for distilled alcoholic spirits consisting of an open substantially rectangular cage-like structure formed of a series of relatively flat transversely interlocking charred panels, each panel being a separate unit and comprising a series of spaced strip-like members, providing an equally free circulation through and around all parts of said device.

CLARENCE D. NAGLE.